(12) United States Patent
Tanimoto et al.

(10) Patent No.: US 7,777,372 B2
(45) Date of Patent: Aug. 17, 2010

(54) ELECTRIC MOTOR, ELECTRIC TOOL HAVING THE MOTOR, AND ELECTRIC MOTOR PRODUCTION METHOD

(75) Inventors: Hideyuki Tanimoto, Hitachinaka (JP); Shinichi Sakamoto, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 1032 days.

(21) Appl. No.: 11/153,505

(22) Filed: Jun. 16, 2005

(65) Prior Publication Data

US 2006/0043816 A1    Mar. 2, 2006

(30) Foreign Application Priority Data

Aug. 24, 2004    (JP)    ............................ P2004-243619

(51) Int. Cl.
*H02K 1/06*    (2006.01)
(52) U.S. Cl. .................. 310/47; 310/156.26; 310/43
(58) Field of Classification Search .................. 310/47, 310/156.26
See application file for complete search history.

(56) References Cited

U.S. PATENT DOCUMENTS

| | | | | |
|---|---|---|---|---|
| 2,729,758 A | * | 1/1956 | Knapp ........................ | 310/59 |
| 3,060,335 A | * | 10/1962 | Greenwald .................. | 310/54 |
| 3,119,942 A | * | 1/1964 | Luther ....................... | 173/171 |
| 3,123,729 A | * | 3/1964 | Fagel .......................... | 310/43 |
| 3,213,307 A | * | 10/1965 | Summerfield ............... | 310/234 |
| 3,476,960 A | * | 11/1969 | Rees ........................... | 310/50 |
| 3,694,680 A | * | 9/1972 | Jacyno ........................ | 310/50 |
| 3,824,684 A | * | 7/1974 | Wheeler ...................... | 29/596 |
| 4,083,735 A | * | 4/1978 | Caramanian ................ | 156/64 |
| 4,800,315 A | * | 1/1989 | Schulz et al. ................ | 310/261 |
| 5,275,141 A | | 1/1994 | Tsunoda et al. | |
| 5,361,853 A | * | 11/1994 | Takamura et al. ........... | 173/217 |
| 5,659,217 A | * | 8/1997 | Petersen .................. | 310/156.26 |

(Continued)

FOREIGN PATENT DOCUMENTS

DE    10256805 A1 *    6/2004

(Continued)

OTHER PUBLICATIONS

GB patent applicantion No. 2021330 A, Stanley D N, Nov. 28, 1979.*

(Continued)

*Primary Examiner*—Quyen Leung
*Assistant Examiner*—Naishadh N Desai
(74) *Attorney, Agent, or Firm*—Antonelli, Terry, Stout & Kraus, LLP.

(57) ABSTRACT

An electric motor designed for electric tools. The motor includes a first molded coil having a first coil covered entirely with a resin that is electrically insulating and highly heat conductive. The motor also includes a second molded coil having a second coil covered entirely with the resin. The first molded coil has a pair of first axial portions, and the second molded coil has a pair of second axial portions in alignment with the first axial portions. A stator core disposed around the molded coils includes a first stator core and a second stator core with first stator core legs and second stator core legs, respectively. Air paths through which fan airflow passes are formed between the axial portions and the opposing stator core legs.

12 Claims, 13 Drawing Sheets

U.S. PATENT DOCUMENTS

| | | | |
|---|---|---|---|
| 5,731,651 A * | 3/1998 | Hyodo | 310/261 |
| 6,137,205 A * | 10/2000 | Hung et al. | 310/261 |
| 6,320,286 B1 * | 11/2001 | Ramarathnam | 310/50 |
| 6,448,683 B2 * | 9/2002 | Wiesler et al. | 310/235 |
| 7,096,566 B2 * | 8/2006 | Du et al. | 29/596 |
| 7,215,048 B2 * | 5/2007 | Du et al. | 310/43 |
| 2004/0061386 A1 * | 4/2004 | Amagi et al. | 310/43 |

FOREIGN PATENT DOCUMENTS

| | | |
|---|---|---|
| JP | 4-355651 | 12/1992 |
| JP | S59-126554 | 8/1994 |
| JP | 8009601 | 1/1996 |
| JP | 9-322452 | 12/1997 |
| JP | 10-145992 | 5/1998 |
| JP | 11-27886 | 1/1999 |
| JP | 2000-210884 | 8/2000 |
| JP | 2001-231224 | 8/2001 |
| JP | 2001-238390 | 8/2001 |
| JP | 2001-292544 | 10/2001 |
| JP | 2003-164088 | 6/2003 |
| JP | 2004-120923 | 4/2004 |

OTHER PUBLICATIONS

Japanese Official Action dated Jul. 7, 2009 for Application No. 2004-243619.

Japanese Official Action dated Feb. 2, 2010 for Application No. 2004-243619.

* cited by examiner

ELECTRIC MOTOR, ELECTRIC TOOL HAVING THE MOTOR, AND ELECTRIC MOTOR PRODUCTION METHOD

BACKGROUND OF THE INVENTION

1. Field of the Invention

The present invention relates to an electric motor having a coil that has been molded with resin, an electric tool provided with the electric motor, and a method of manufacturing the electric motor.

2. Description of the Related Art

Numerous configurations for electric motors provided in electric tools have been proposed. One technology attempts to stabilize the shapes of the coil and stator core by wrapping a part of the coil with an insulating paper, fitting the coil into a slot of the stator core while deforming the coil, and immersing the coil and stator core in varnish to fix the two as an integral unit.

Another method for stabilizing the shapes of the coil and stator core is disclosed in Japanese patent application publication No. HEI-8-9601. The method involves deforming the coil partially wrapped in an insulating paper to fit into the slot of the stator core and covering the coil and part of the stator core with a resin to form an integral unit.

However, in the conventional electric motor described above, the portion of the coil wrapped in the insulating paper has poor heat dissipation. Further, the process of deforming the coil to fit into the slot of the stator core requires a skilled technique, as well as much time and expense to complete. Also, reusability of the stator core is poor when the coil and stator core are fixed together with varnish or resin because a prolonged time and effort is needed to remove the coil from the stator core.

Further, when fitting the coil into the stator core, gaps are formed between adjacent magnet wires, unnecessarily increasing the amount of resin needed to cover the coil because the resin flows into the gaps, and therefore increasing the weight of the motor. It is also difficult to form air paths between the coil and stator core after the coil has been fitted into the stator core.

SUMMARY OF THE INVENTION

In view of the foregoing, it is an object of the present invention to provide an electric motor capable of drastically increasing cooling efficiency, and to provide an electric tool provided with the electric motor.

Another object of the present invention is to provide a method of manufacturing the electric motor that can reduce manufacturing costs and improve the reusability of the stator core.

In order to attain the above and other objects, the present invention provides a housing, an electric motor, and a fan. The housing is formed with an air inlet for taking in air, and an air outlet for exhausting air. The electric motor includes a stator core, a first molded coil, a second molded coil, and a rotor. The stator core is accommodated in and fixed to the housing. The stator core includes a first coil mounting portion, and a second coil mounting portion opposing the first coil mounting portion and providing a hollow area in cooperation with the first coil mounting portion. The first molded coil is mounted in the first coil mounting portion and includes a first coil entirely covered with a resin. The second molded coil is mounted in the second coil mounting portion and opposes the first molded coil. The second molded coil includes a second coil entirely covered with a resin. The rotor is rotatably disposed in the hollow area and between the first molded coil and the second molded coil. The fan is disposed in the housing for cooling the first coil and second coil by drawing air into the housing through the air inlet and blowing the air out of the housing through the air outlet.

In another aspect of the invention, there is provided a motor including the stator core, the first molded coil, the second molded coil, and rotor.

In another aspect of the invention, there is provided a method of manufacturing an electric motor includes manufacturing a first coil by winding a magnet wire a prescribed number of turns, and manufacturing a second coil by winding a magnet wire a prescribed number of turns, integrally manufacturing a first molded coil and a second molded coil by disposing the first coil and the second coil opposite each other in close proximity and covering the first coil and second coil with a resin, and interposing the integrated first molded coil and second molded coil between a first stator core having a first coil mounting portion and a second stator core having a second coil mounting portion, and mounting the first molded coil and the second molded coil in the first coil mounting portion and the second coil mounting portion, respectively.

In another aspect of the invention, there is provided a method for manufacturing an electric motor includes manufacturing a first coil by winding a magnet wire a prescribed number of turns, and manufacturing a second coil by winding a magnet wire a prescribed number of turns, manufacturing a first molded coil by covering the first coil with a resin, manufacturing a second molded coil separately from the first molded coil by covering the second coil with a resin, positioning the first molded coil and the second molded coil opposite to each other in close proximity, and interposing the first molded coil and the second molded coil between a first stator core having a first coil mounting portion and a second stator core having a second coil mounting portion, and mounting the first molded coil and the second molded coil in the first coil mounting portion and the second coil mounting portion, respectively.

BRIEF DESCRIPTION OF THE DRAWINGS

The above and other objects, features, and advantages of the invention will become more apparent from reading the following description of the preferred embodiments taken in connection with the accompanying drawings in which.

DESCRIPTION OF THE PREFERRED EMBODIMENTS

Figure 1:
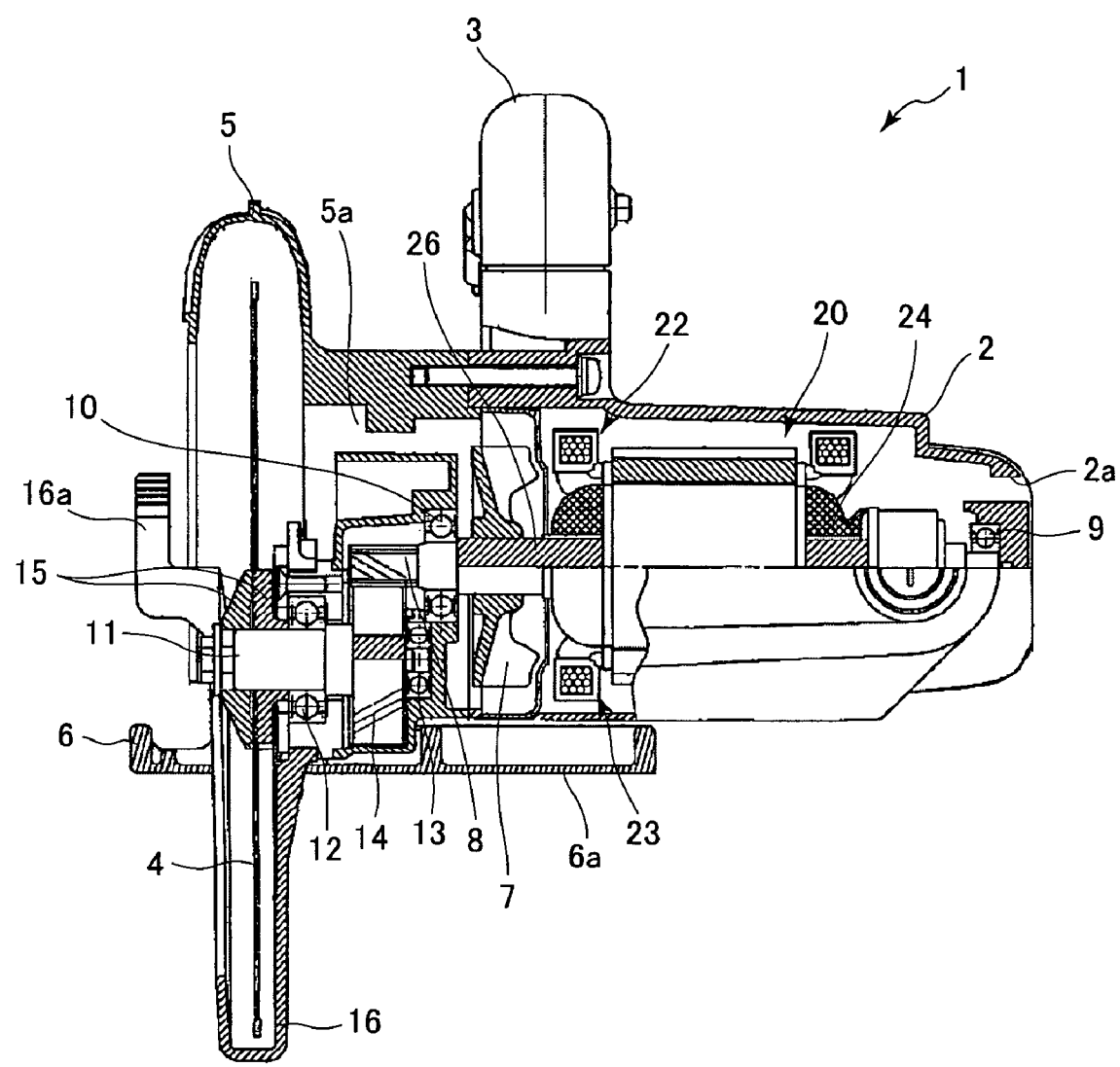
FIG. 1 is a partial cross-sectional view showing a portable circular saw according to a first embodiment of the present invention.

A motor for a electric tool according to preferred embodiments of the present invention will be described while referring to the accompanying drawings wherein like parts and components are designated by the same reference numerals to avoid duplicating description. The electric tool of the present invention is applied to a portable electric circular saw.

A motor for a portable electric circular saw 1 according to a first embodiment of the present invention will be described with reference to FIGS. 1 through 4D. As shown in FIG. 1, a portable electric circular saw 1 includes a housing 2 which internally supports and houses a motor 20, a handle 3, a saw blade 4, a saw cover 5, a base 6, and a fan 7. An air inlet duct 2a which connects the interior and exterior of the housing 2 is formed on one end of the housing 2. The handle 3 is provided integrally with the housing 2 or linked to the housing 2 as a separate member. A switch (not shown) is provided to control the drive of the motor 20. The saw blade 4 is rotatable in only a normal rotation direction which can cut a workpiece. The saw cover 5 is mounted to the housing 2, and is shaped so as to cover the upper half of the periphery of the saw blade 4.

A fan airflow outlet 5a is formed on the saw cover 5 to discharge the fan airflow (not shown). The base 6 is connected to the housing 2 via the saw cover 5 and has a bottom surface 6a that slides on the workpiece. The base 6 is formed with an opening (not shown) through which the saw blade 4 is projected downward beyond the bottom surface 6a. The motor 20 has a first molded coil 22, a second molded coil 23 and a rotor 24. The fan 7 is fixed to an output shaft 26 rotatably supported with the rotor 24 to cool the first coil 22, the second coil 23 and the rotor 24.

A pinion gear 8 is disposed at an end of the output shaft 26. The output shaft 26 and the pinion gear 8 are rotatably supported by first bearings 9 and 10. The first bearings 9 and 10 are provided on the air inlet duct 2a side of the housing 2 and on the saw cover 5, respectively. A drive shaft 11 extending parallel to the output shaft 26 is rotatably supported by second bearings 12 and 13 within the saw cover 5. The drive shaft 11 extends through the saw cover 5, and a gear 14 is coaxially fixed to the drive shaft 11. The gear 14 is in a meshing engagement with the pinion gear 8. A pair of saw blade locking members 15 are attached to the drive shaft 11. The saw blade locking members 15 are not rotatable relative to the drive shaft 11 and pinch the saw blade 4 therebetween.

The portable electric circular saw 1 further includes a safety cover 16 pivotably supported by the drive shaft 11. The safety cover 16 is adapted to cover substantially a lower half of the outer periphery of the saw blade 4 and can be retracted into the saw cover 5. The safety cover 16 has a lever 16a for manual pivotal movement operations. The safety cover 16 is urged by an urging member (not shown), such as a spring. FIG. 1 shows the initial state of the safety cover 16, where the most part of the safety cover 16 projects downward beyond the bottom surface 6a of the base 6 so as to prevent the outer periphery of the saw blade 4 from being exposed. When a cutting operation is conducted, the front end of the safety cover 16 abuts the rear end of the workpiece. As the user slides the portable electric circular saw 1 on the workpiece in the cutting direction, the safety cover 16 is pivotably moved about the drive shaft 11 and enters the saw cover 5 against the urging force of the urging member, exposing the saw blade 4 at the bottom surface 6a of the base 6.

Figure 2:
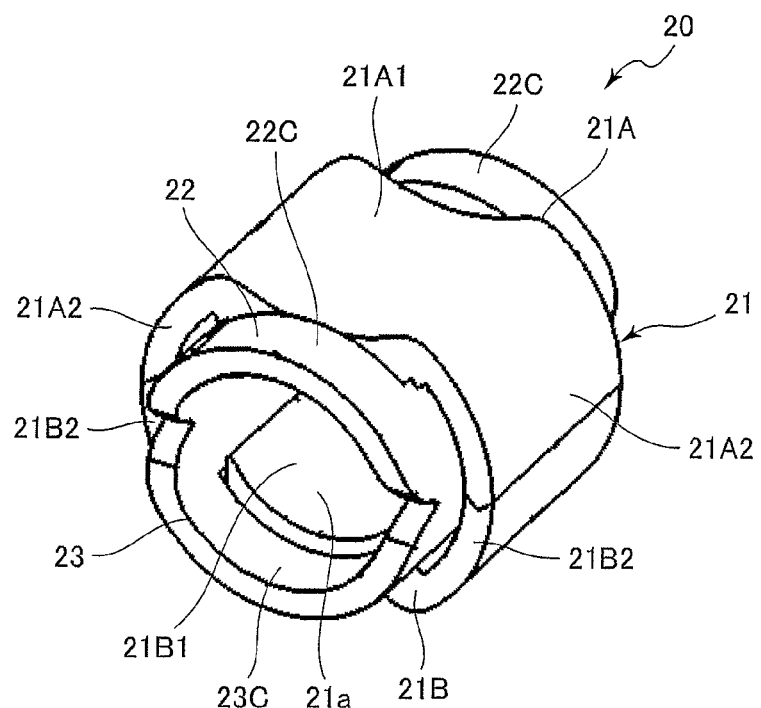
FIG. 2 is a perspective view of an electric motor according to the first embodiment.

Next, the motor 20 will be described with reference to FIG. 2 and FIG. 3. The rotor 24 has been omitted from FIGS. 2 and 3. The motor 20 includes a stator core 21, the first molded coil 22 and second molded coil 23 (see also FIG. 4C) configured as an integral unit, and the rotor 24 (see FIG. 1). The stator core 21 is supported and fixed by a plurality of ribs (not shown) in the housing 2 and includes a first stator core 21A and a second stator core 21B opposing the first stator core 21A.

The first stator core 21A includes a first coil mounting portion 21A1 and a pair of first stator core legs 21A2. The first molded coil 22 is mounted on the first coil mounting portion 21A1. The pair of first stator core legs 21A2 extend from both ends of the first coil mounting portion 21A1 in the circumferential direction of the rotor 24 and along the outer periphery of the rotor 24. Similarly, the second stator core 21B includes a second coil mounting portion 21B1 and a pair of second stator core legs 21B2. Free ends of the first stator core legs 21A2 fit into free ends of the second stator core legs 21B2 opposing the first stator core legs 21A2, thereby forming a hollow area 21a into which the rotor 24 is loosely inserted.

The first coil mounting portion 21A1 includes a first contact surface 21C and a second contact surface 21 D those extending along the axis of the stator core 21 substantially parallel to each other for contacting and supporting a pair of first axial portions 22D of the first molded coil 22 described later. Similarly, the second coil mounting portion 21B1 includes a third contact surface 21E and a fourth contact surface 21F those substantially parallel to each other for contacting and supporting a pair of second axial portions 23D of the second molded coil 23 described later. Here, the first contact surface 21C and third contact surface 21E are positioned substantially in the identical plane, I-I in FIG. 3, and the second contact surface 21D and fourth contact surface 21 F are also positioned substantially in another identical plane II-II in FIG. 3.

The first molded coil 22 has a first coil 22A that is entirely covered with a thermosetting resin 25 that is electrically insulating and has high thermal conductivity, such as a vinylester resin with alumina filler. Similarly, the second molded coil 23 includes a second coil 23A entirely covered with the thermosetting resin 25. The first molded coil 22 includes a pair of first circumferential portions 22C, and a pair of first axial portions 22D. The second molded coil 23 also includes a pair of second circumferential portions 23C, and a pair of second axial portions 23D. The pairs of first and second circumferential portions 22C and 23C project outward from both axial ends of the stator core 21 (see FIG. 2), and are roughly arc-shaped along the periphery of the rotor 24, respectively. The pairs of the first and second axial portions 22D and 23D extend inside the stator core 21 in the axial direction of the rotor 24, respectively.

The pairs of first circumferential portions 22C and first axial portions 22D form a substantially rectangular shape, and are mounted around the first coil mounting portion 21A1. Similarly, the pairs of second circumferential portions 23C and second axial portions 23D form a substantially rectangular shape, and are mounted around the second coil mounting portion 21B1. The first axial portions 22D have first opposing surfaces 22E that oppose the rotor 24. The second axial portions 23D have second opposing surfaces 23E that oppose the rotor 24.

An opening S1 (see FIG. 4D) is defined by the first circumferential portions 22C and first axial portions 22D, while an opening S2 is defined by the second circumferential portions 23C and second axial portions 23D. As shown in FIG. 3, the first axial portions 22D are formed continuously from and integrally with the second axial portions 23D, thereby configuring the first and second molded coils 22 and 23 as an integral unit.

Air paths 27 through which fan airflow can pass are provided between one of the continuously formed first and second axial portions 22D and 23D and the opposing first and second stator core legs 21A2 and 21B2, and between the remaining one of the continuously formed first and second axial portions 22D and 23D and the opposing first and second stator core legs 21A2 and 21B2.

Next, operation of the circular saw 1 will be described. When a switch (not shown) on the circular saw 1 is turned to the ON position, a power supply (not shown) supplies an electric current to the first and second coils 22A and 23A and the rotor 24. The current generates a magnetic field between the first coil 22A and second coil 23A. The magnetic field and the current flowing through the rotor 24 generate a force that rotates the rotor 24. Rotations of the rotor 24 cause the output shaft 26 to rotate, and the rotational force of the output shaft 26 is transferred to the saw blade 4 via the pinion gear 8, gear 14, drive shaft 11, and saw blade locking members 15, whereby the saw blade 4 rotates in a normal direction for performing a cutting operation.

During the cutting operation, the rotations of the output shaft 26 also rotate the fan 7. The rotating fan 7 draws air into the housing 2 via the air inlet 2a. The air passes through the air paths 27 and cools the first and second molded coils 22 and 23 in which heat is generated by the flowing current. The fan airflow flows in the radial direction of the fan 7 and in the axial direction of the rotor 24, and is discharged from the fan airflow outlet 5a.

By providing the air path 27, the area of the surface that dissipates heat generated in the first and second molded coils 22 and 23 is about 40% greater than that in a conventional motor. Hence, the cooling efficiency of the fan airflow increases dramatically, thereby increasing the service life of the motor 20 and greatly improving the rated input of the circular saw 1. Further, the circular saw 1 can be operated with the motor 20 at application of greater load which is a load about 1.15 as large as the load to be applied to a conventional motor.

Since the first and second coils 22A and 23A are covered entirely by the thermosetting resin 25, the shapes of these components can be stabilized. The thermosetting resin 25 is also unlikely to deform from heat even when the motor 20 reaches high temperatures as the result of application of a large load. Since the first and second coils 22A and 23A are unlikely to deform by heat, it is possible to prevent the first and second circumferential portions 22C and 23C from deforming and coming into contact with the rotor 24, thereby improving the durability of the motor 20. By configuring the first and second molded coils 22 and 23 as an integral unit, the shapes of the first and second coils 22A and 23A can be further stabilized.

By covering the first and second coils 22A and 23A entirely with the thermosetting resin 25 that is electrically insulating and highly heat conductive, there is no need to wrap insulating paper having poor heat conductivity about the first and second axial portions 22D and 23D as is done in conventional coils. Therefore, this construction can improve heat dissipation from the first and second axial portions 22D and 23D. By setting the width of the air path 27 in the radial direction of the stator core 21 wider than the width of the air inlet 2a, foreign matter that enters the housing 2 via the air inlet 2a will not clog the air path 27, which can prevent the reduction of the cooling capability of the motor 20, thereby ensuring good rotational performance.

Deep slots for holding coils to the stator core may not be formed in the first and second coil mounting portions 21A1 and 21B1, thereby shortening the paths of magnetic flux generated by the current flowing through the first and second coils 22A and 23A. Hence, it is possible to reduce magnetic resistance and improve the rotational performance of the motor 20.

Figure 4A:
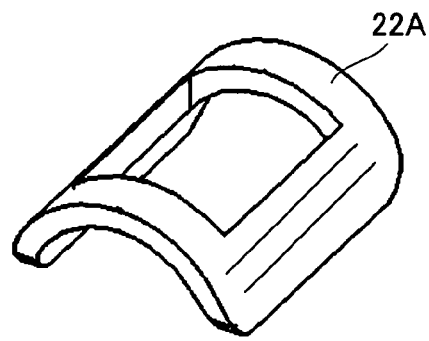
FIG. 4A is a perspective view of a first coil constituting the motor of FIG. 2.
Figure 4B:
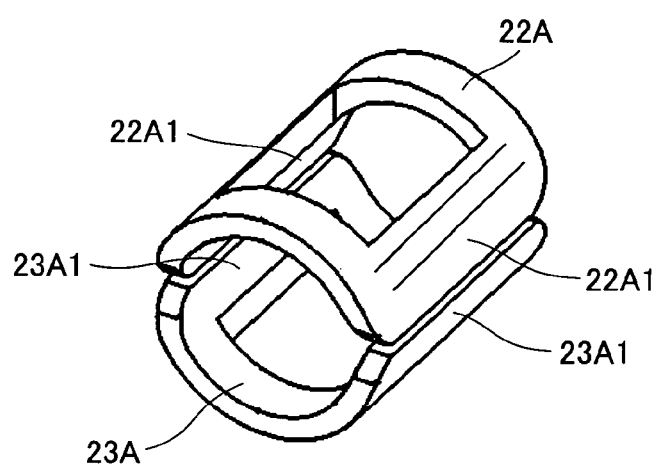
FIG. 4B is a perspective view showing the first coil and a second coil constituting the motor of FIG. 2, wherein the coils confront each other in close proximity.
Figure 4C:
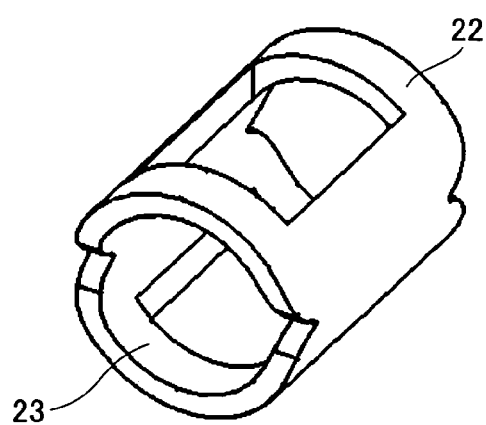
FIG. 4C is a perspective view showing a first molded coil and second molded coil integrally formed in the motor of FIG. 2.

Next, a method of manufacturing the motor 20 of the first embodiment will be described with reference to FIG. 4A through FIG. 4D. The first coil 22A shown in FIG. 4A is manufactured by winding magnet wire a prescribed number of turns. The second coil 23A having the same shape as the first coil 22A is manufactured in the same way. Next, as shown in FIG. 4B, the first and second coils 22A and 23A are disposed such that a pair of first axial equivalent portions 22A1 of the first coil 22A approach and oppose second axial equivalent portions 23A1 of the second coil 23A. In FIG. 4C the integrated first molded coil 22 and second molded coil 23 are manufactured by covering the entire first and second coils 22A and 23A with the thermosetting resin 25.

Figure 3:
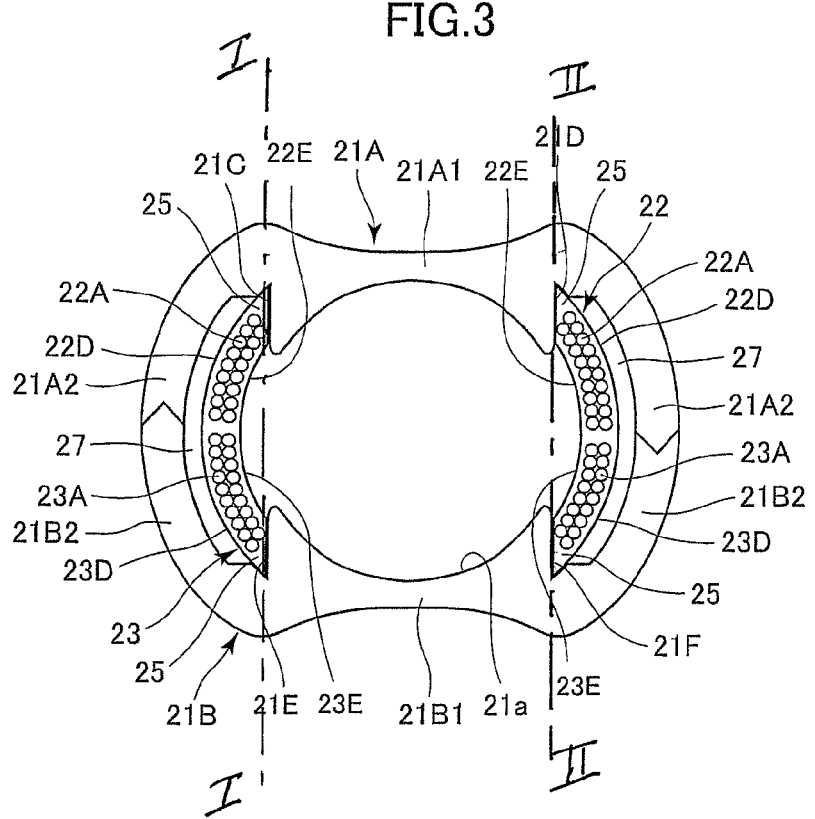
FIG. 3 is a cross-sectional view of the motor in FIG. 2 along a direction orthogonal to the longitudinal direction of the motor.
Figure 4D:
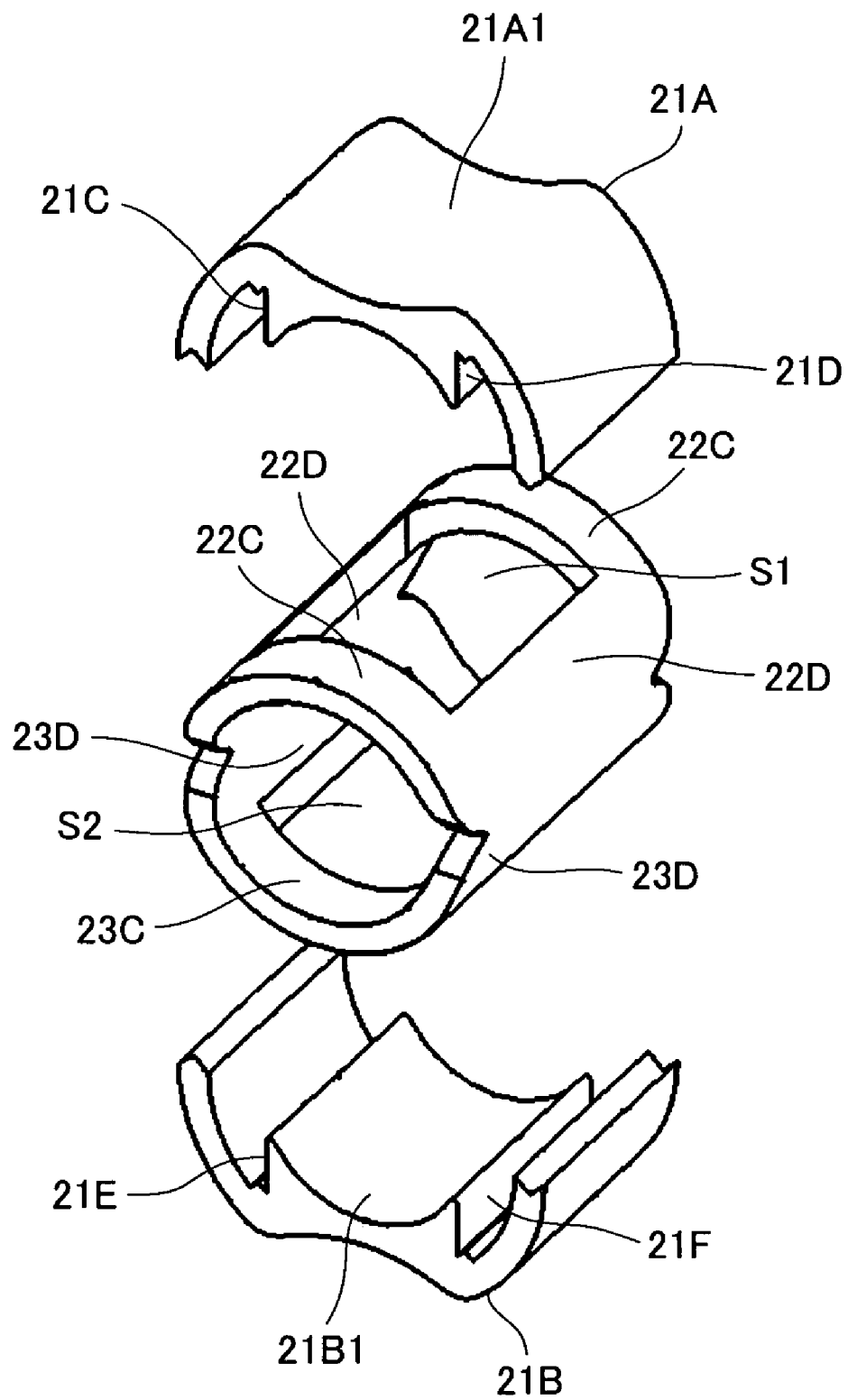
FIG. 4D is a perspective view illustrating a step for interposing the integrated first molded coil and second molded coil between a first stator core and a second stator core.

Next, as shown in FIG. 4D, a portion of the first coil mounting portion 21A1 is inserted into the opening S1 until the pair of first axial portions 22D contact the first contact surface 21C and second contact surface 21D (see FIG. 3). Similarly, a portion of the second coil mounting portion 21B1 is inserted into the opening S2 until the pair of second axial portions 23D contact the third contact surface 21E and fourth contact surface 21F. In this way, the motor 20 of FIG. 2 is manufactured such that the integrated first molded coil 22 and second molded coil 23 are interposed between the first stator core 21A and second stator core 21B.

Manufacturing the motor 20 in this way eliminates the need for an operation requiring a skilled technique, as in the conventional manufacturing method of deforming the coil to fit into a slot of the stator core. Accordingly, the manufacturing method of the present embodiment facilitates manufacturing of the motor 20 and reduces time and cost of such manufacturing. Further, since the first and second molded coils 22 and 23 are manufactured as an integral unit by covering the first and second coils 22A and 23A disposed in close proximity to each other with the thermosetting resin 25, manufacturing costs are less than those for covering each coil separately with resin. Further, by configuring the first and second molded coils 22 and 23 as an integral unit, gaps and the like do not form between the first and second molded coils 22 and 23 when mounted in the stator core 21, thereby securely fixing the first and second molded coils 22 and 23 to the stator core 21.

Since the first molded coil 22 and second molded coil 23 can be easily separated from the stator core 21 after the motor 20 has been used, reusability of the stator core is much better than that of a conventional motor in which the coil and stator core have been fixed together by varnish. Further, since only the first and second coils 22A and 23A are covered with the thermosetting resin 25, the shape of the metal molds can be simplified, thereby reducing manufacturing costs.

Further, the air paths 27 shown in FIG. 3 can be easily provided by hardening the first and second coils 22A and 23A with the thermosetting resin 25 and subsequently interposing the first and second molded coils 22 and 23 between the first and second stator cores 21A and 21B. Further, a manufacturing operation is no longer necessary for deforming the coil while fitting the coil into the slot of a stator core, thereby reducing the number of gaps that may be formed between adjacent magnet wires of the first and second coils 22A and 23A. As a result, less of the thermosetting resin 25 is required to cover the first and second coils 22A and 23A, reducing the overall weight of the motor 20.

Figure 5:
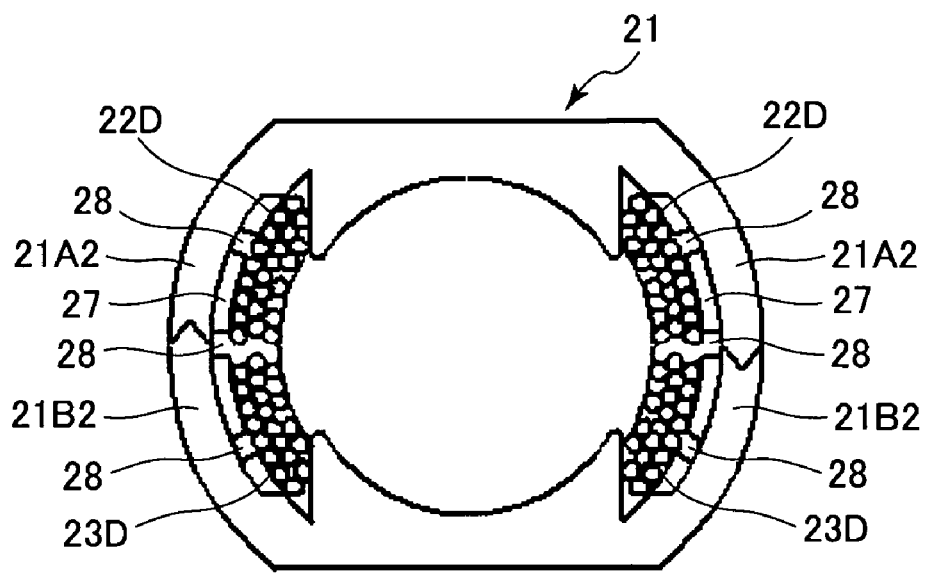
FIG. 5 is a cross-sectional view showing a motor according to a second embodiment taken along a direction orthogonal to the longitudinal direction of the motor.

Next, a motor according to a second embodiment of the present invention will be described with reference to FIG. 5. As shown in FIG. 5, a plurality of protrusions 28 integrally protrude from the first and second axial portions 22D and 23D. The plurality of protrusions 28 connect the first and second axial portions 22D and 23D to the first and second stator core legs 21A2 and 21B2 and partition the air paths 27. With this construction, the first molded coil 22 and second molded coil 23 can be securely fixed to the stator core 21.

Figure 6:
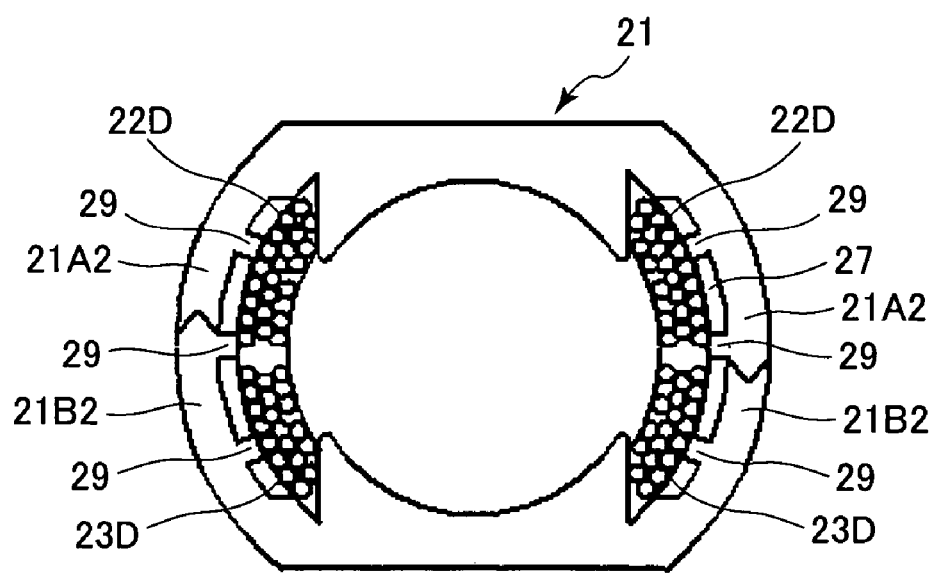
FIG. 6 is a cross-sectional view showing a motor according to a third embodiment taken along a direction orthogonal to the longitudinal direction of the motor.

FIG. 6 shows a motor according to a third embodiment of the present invention. In the third embodiment, a plurality of protrusions 29 integrally protrude from the first and second stator core legs 21A2 and 21B2 so as to connect the first and second stator core legs 21A2 and 21B2 to the first and second axial portions 22D and 23D and partition the air paths 27. With this construction, the first molded coil 22 and second molded coil 23 can be securely fixed to the stator core 21.

Figure 7:
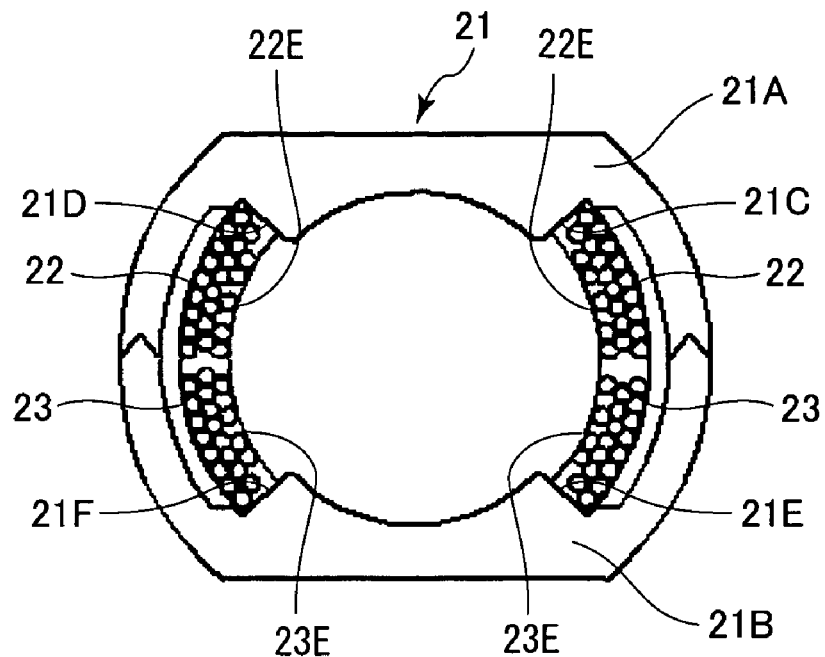
FIG. 7 is a cross-sectional view showing a motor according to a forth embodiment taken along a direction orthogonal to the longitudinal direction of the motor.

FIG. 7 shows a motor according to a fourth embodiment of the present invention. As shown in FIG. 7, the first and second contact surfaces 21C and 21D need not be substantially parallel to each other, and the third and fourth contact surfaces 21E and 21F need not be substantially parallel to each other in contrast to the forgoing embodiments. The first opposing surfaces 22E and second opposing surfaces 23E are out of contact from the first stator core 21A and second stator core 21B. An angle between the inner surface of the first stator core legs 21A2 and the first and second contact surfaces 21C and 21D is greater than that of the forgoing embodiments. Similarly, an angle between the inner surface of the second stator core legs 21B2 and the third and fourth contact surfaces 21E and 21F is greater than that of the forgoing embodiments. With this construction, the first molded coil 22 and second molded coil 23 can be easily mounted in the stator core 21.

Figure 8:
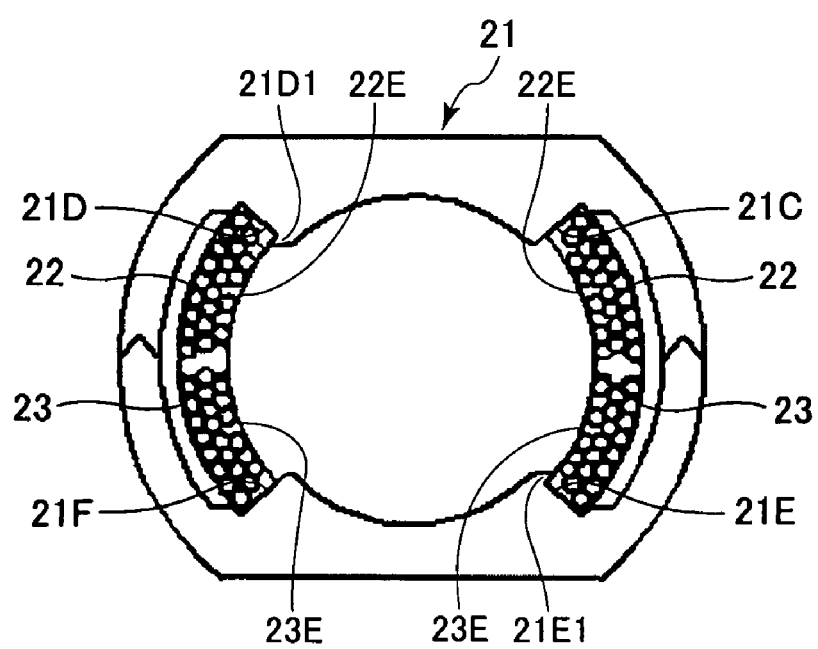
FIG. 8 is a cross-sectional view showing a motor according to a fifth embodiment taken along a direction orthogonal to the longitudinal direction of the motor.

FIG. 8 shows a motor according to a fifth embodiment of the present invention. Here, in addition to the shape of the stator core 21 shown in FIG. 7, a first coil holding portion 21D1 and a second coil holding portion 21E1 are provided on inside ends of the second contact surface 21D and third contact surface 21E with respect to the radial direction of the stator core 21. The first coil holding portion 21D1 and the second coil holding portion 21E1 are in contact with the first and second opposing surfaces 22E and 23E. With this construction, the first and second molded coils 22 and 23 can be securely fixed to the first and second stator cores 21A and 21B.

Figure 9:
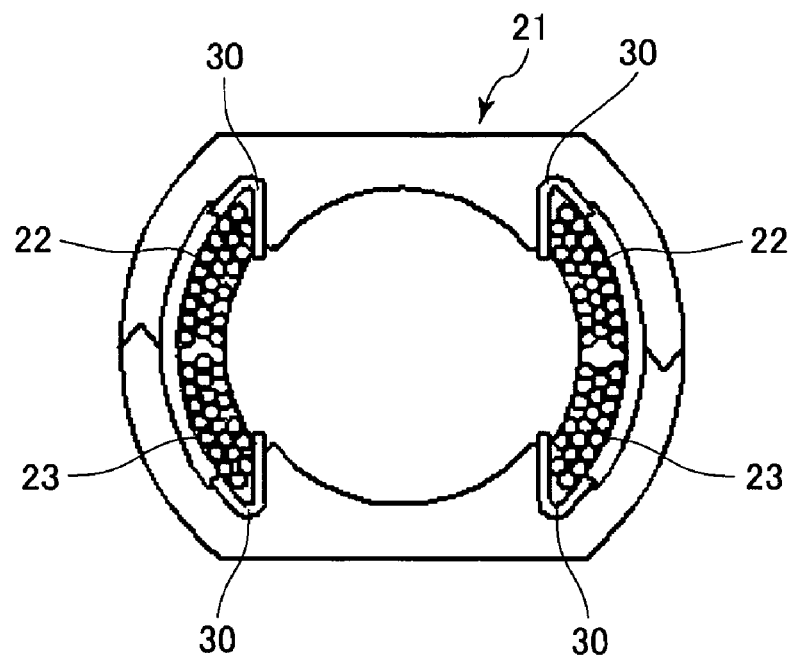
FIG. 9 is a cross-sectional view showing a motor according to a sixth embodiment taken along a direction orthogonal to the longitudinal direction of the motor.

FIG. 9 shows a motor according to a sixth embodiment of the present invention. As shown in FIG. 9, first spacers 30 are provided between the stator core 21 and the first and second molded coils 22 and 23. This construction can eliminate slight gaps formed between the stator core 21 and the first and second molded coils 22 and 23, eliminating a looseness or rattling therebetween. Hence, this construction prevents damage to the first molded coil 22 and second molded coil 23 caused by vibrations or impacts. By further forming the first spacers 30 with an electrically insulating material, this construction can improve the insulating capacity of the stator core 21.

Figure 10:
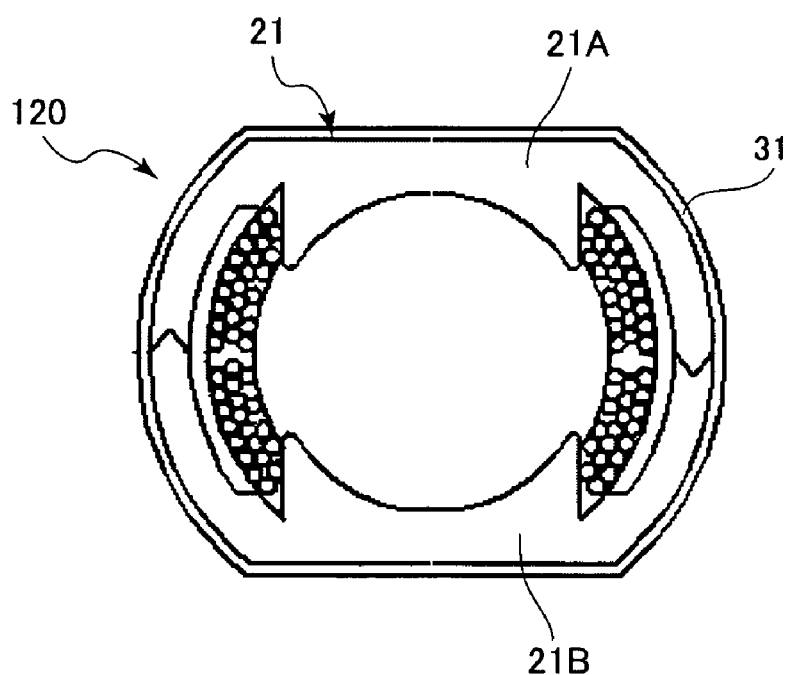
FIG. 10 is a cross-sectional view showing a motor according to a seventh embodiment taken along a direction orthogonal to the longitudinal direction of the motor.

FIG. 10 shows a motor according to a seventh embodiment of the present invention. Here, the entire periphery of the stator core 21 or at least a part of the periphery of the stator core 21 are covered with a resin 31. With this construction, a motor 120 is configured such that the integrated structure of the stator core 21 including the first stator core 21A and second stator core 21B can be maintained even when the housing 2 that supports and fixes the motor 120 is insufficiently rigid. Hence, it is possible to reduce the number of ribs (not shown) in the housing 2 described above. The cooling air paths provided between the housing 2 and the stator core 21 can also be increased to further improve the cooling efficiency of fan airflow in the motor 120 because of reduction in ribs.

Figure 11A:
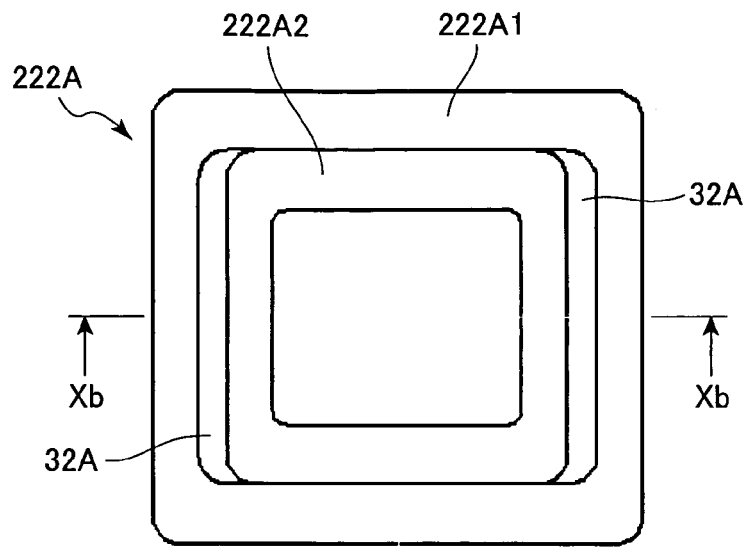
FIG. 11A is a schematic diagram showing a structure of a first coil according to an eighth embodiment.
Figure 11B:
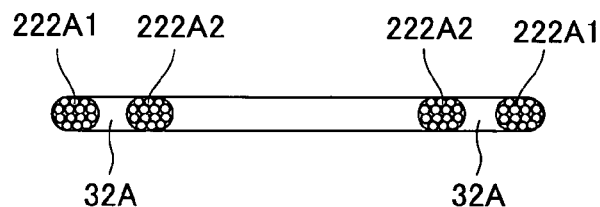
FIG. 11B is a cross-sectional view taken along a line Xb-Xb in FIG. 11A.
Figure 11C:
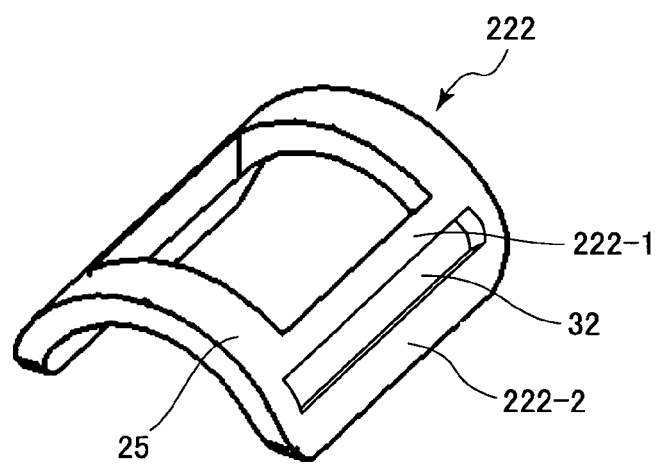
FIG. 11C is a perspective view showing a first molded coil according to the eighth embodiment.
Figure 11D:
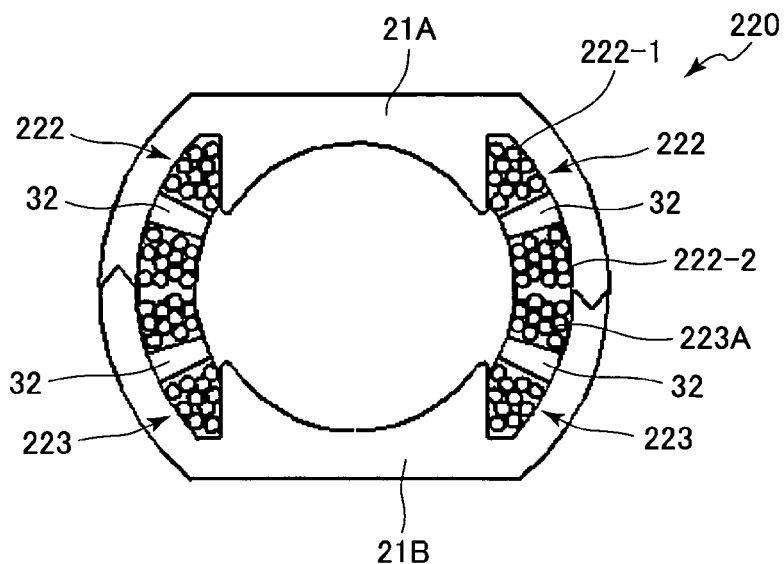
FIG. 11D is a cross-sectional view showing a motor according to the eighth embodiment taken along a direction orthogonal to the longitudinal direction of the motor.

FIGS. 11A-11D show a motor according to an eighth embodiment of the present invention. As shown in FIGS. 11A and 11B, a first coil 222A corresponding to the first coil 22A of the first embodiment includes of a first outer coil 222A1, and a first inner coil 222A2. Air path equivalent areas 32A are formed between the first outer coil 222A1 and first inner coil 222A2 on opposing sides of the first outer coil 222A1. The first coil 222A is shaped similar to the first coil 22A in FIG. 4A. The first coil 222A is disposed opposite a second coil 223A having the shape identical with the first coil 222A (see FIG. 11D), and both are covered entirely with the thermosetting resin 25 to produce a first molded coil 222 and a second molded coil 223 having the same structure. The first molded coil 222 shown in FIG. 11C corresponding to the first molded coil 22 in the first embodiment includes a first outer molded coil 222-1 and a first inner molded coil 222-2. Air paths 32 are thus provided in the first molded coil 222. A motor 220 having the air paths 32 is produced by fitting the first and second molded coils 222 and 223 between the first and second stator cores 21A and 21B. The motor 220 having this construction can obtain the same effects as the motor 20 having the air paths 27 according to the first embodiment described above.

Figure 12A:
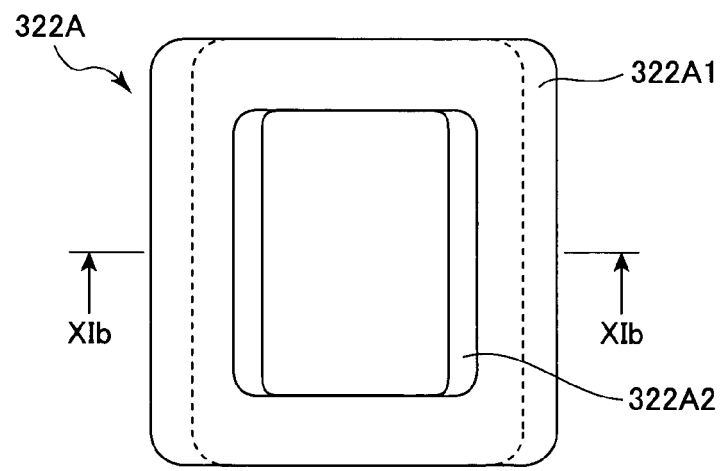
FIG. 12A is a schematic diagram showing a structure of a first coil according to a ninth embodiment of the preferred embodiment.
Figure 12B:
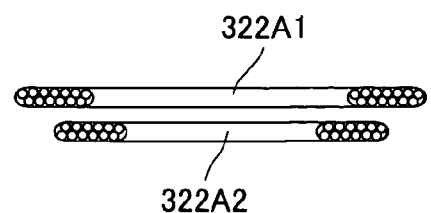
FIG. 12B is a cross-sectional view taken along a line Xib-Xib in FIG. 12A.
Figure 12C:
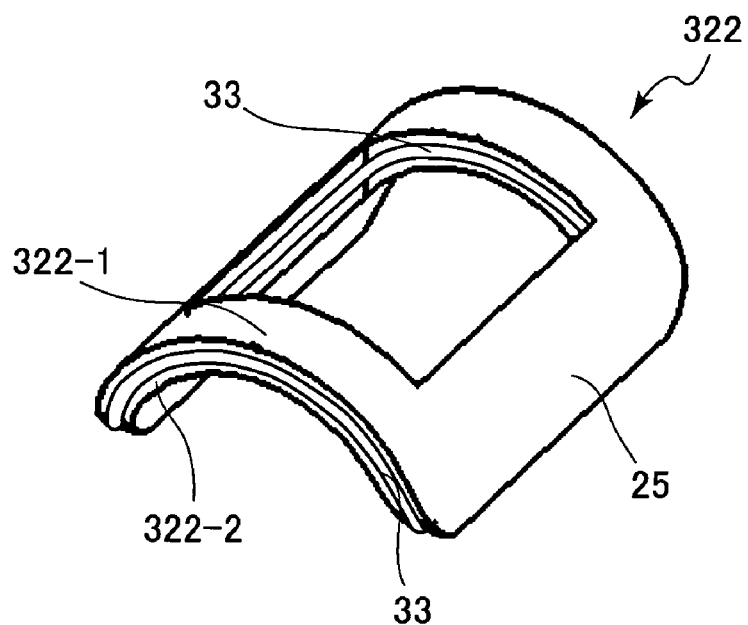
FIG. 12C is a perspective view showing a first molded coil according to the ninth embodiment.
Figure 12D:
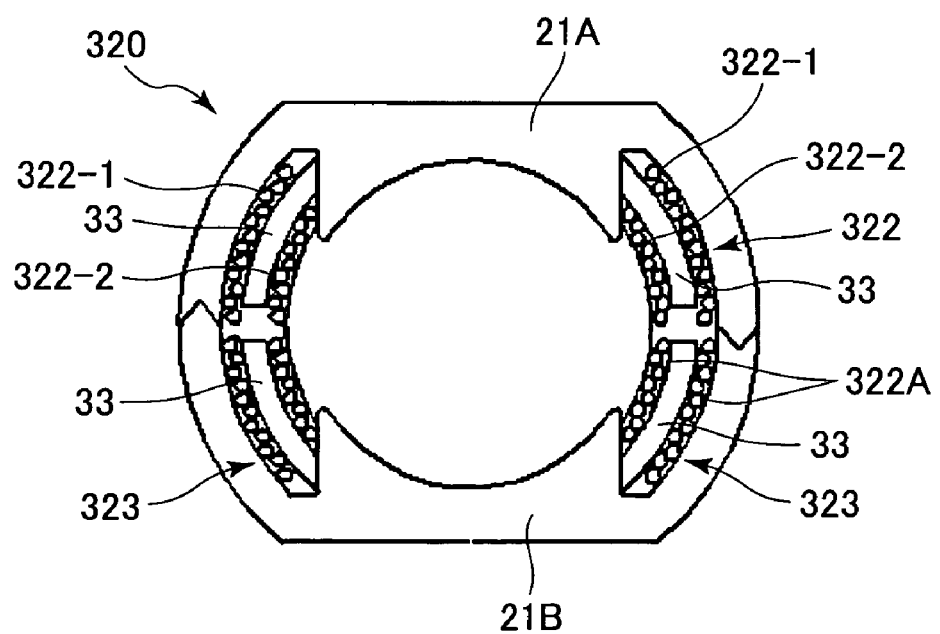
FIG. 12D is a cross-sectional view showing a motor according to the ninth embodiment taken along a direction orthogonal to the longitudinal direction of the motor.

FIGS. 12A-12D show a motor according to a ninth embodiment of the present invention. As shown in FIGS. 12A and 12B, a first coil 322A corresponding to the first coil 22A of the first embodiment includes a second outer coil 322A1 and a second inner coil 322A2 spaced away from the second outer coil 322A1. The first coil 322A is formed in a shape similar to the first coil 22A of FIG. 4A. The first coil 322A is disposed opposite a second coil 323A (see FIG. 12D) of the same shape and both are covered entirely with the thermosetting resin 25 to produce a first molded coil 322 and a second molded coil 323. The first molded coil 322 corresponding to the first molded coil 22 of the first embodiment is configured of a second outer molded coil 322-1 and a second inner molded coil 322-2 and has air paths 33. A motor 320 having the air paths 33 is produced by fitting the first and second molded coils 322 and 323 between the first and second stator cores 21A and 21B. The motor 320 having this construction can obtain the same effects as the motor 20 having the air paths 27 according to the first embodiment.

Figure 13:
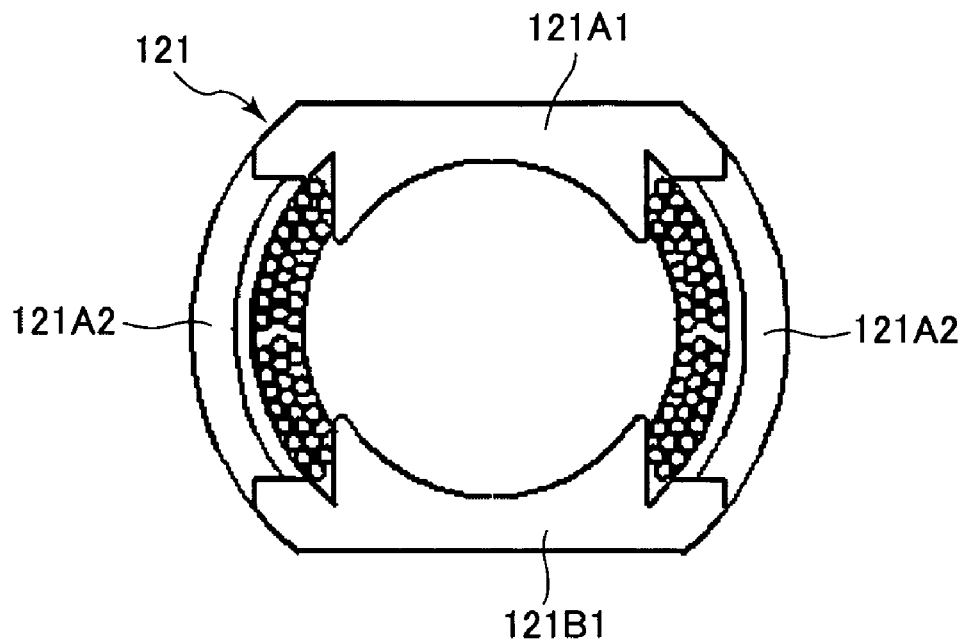
FIG. 13 is a cross-sectional view showing a motor according to a tenth embodiment taken along a direction orthogonal to the longitudinal direction of the motor.

A motor according to a tenth embodiment of the present invention is shown in FIG. 13. The tenth embodiment presents a modification to a shape of a stator core 121. In this embodiment, the stator core 121 includes a first coil mounting portion 121A1 and a second coil mounting portion 121B1 those corresponding to the first and second coil mounting portions 21A1 and 21B1 of the first embodiment, and a pair of third stator core legs 121A2 connecting both ends of the first coil mounting portion 121A1 to both ends of the second coil mounting portion 121B1.

Figure 14:
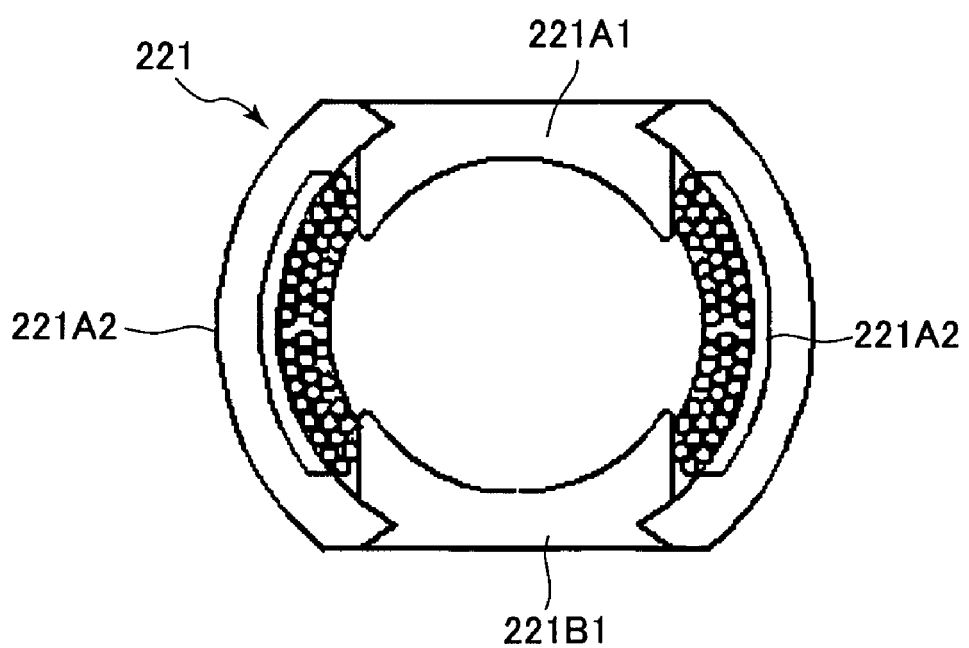
FIG. 14 is a cross-sectional view showing a motor according to an eleventh embodiment taken along a direction orthogonal to the longitudinal direction of the motor.

A motor according to an eleventh embodiment of the present invention is shown in FIG. 14. A stator core 221 of the eleventh embodiment includes a pair of fourth stator core legs 221A2 formed by extending both ends of the third stator core legs 121A2 described above farther along the circumference of the rotor 24, and a first coil mounting portion 221A1 and a second coil mounting portion 221B1 corresponding to the first and second coil mounting portions 121A1 and 121B1, but modified to correspond to the shape of the fourth stator core legs 221A2.

Figure 15:
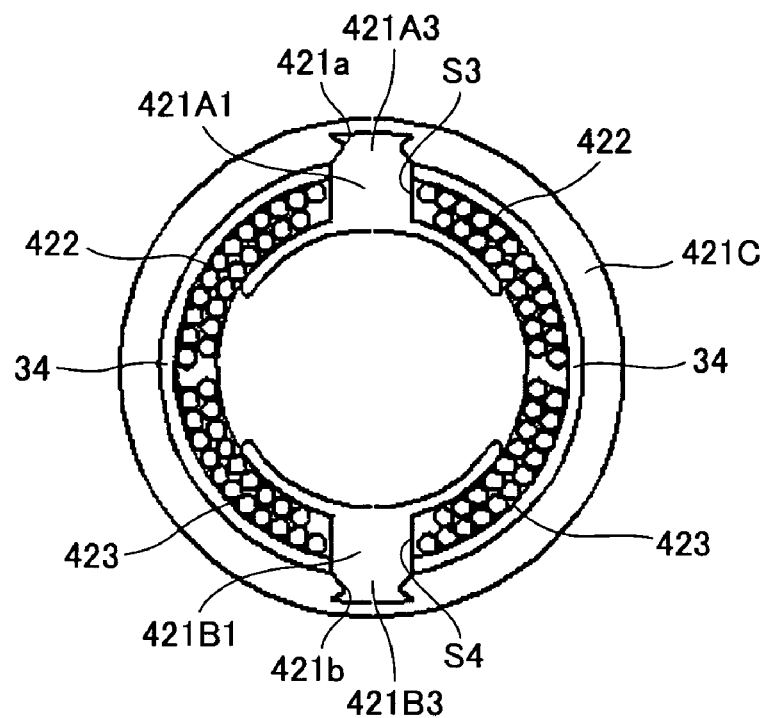
FIG. 15 is a cross-sectional view showing a motor according to a twelfth embodiment taken along a direction orthogonal to the longitudinal direction of the motor.

FIG. 15 shows a motor according to a twelfth embodiment of the present invention. As shown in FIG. 15, a first molded coil 422 and a second molded coil 423 are formed with openings S3 and S4 corresponding to the openings S1 and S2 of the first embodiment but narrower in the circumferential direction of the rotor 24 than the openings S1 and S2. First and second coil mounting portions 421A1 and 421B1 corresponding to the first and second coil mounting portions 21A1 and 21B1 of the first embodiment are inserted into the openings S3 and S4. Engaging portions 421A3 and 421B3 are formed on the radially outer side of the first and second coil mounting portions 421A1 and 421B1. A stator core outer peripheral portion 421C that is substantially cylindrical in shape is provided around the first and second molded coils 422 and 423. The stator core outer peripheral portion 421C has engaging grooves 421a and 421b that engage with the engaging portions 421A3 and 421B3, while forming air paths 34 between the stator core outer peripheral portion 421C and the first and second molded coils 422 and 423.

Figure 16:
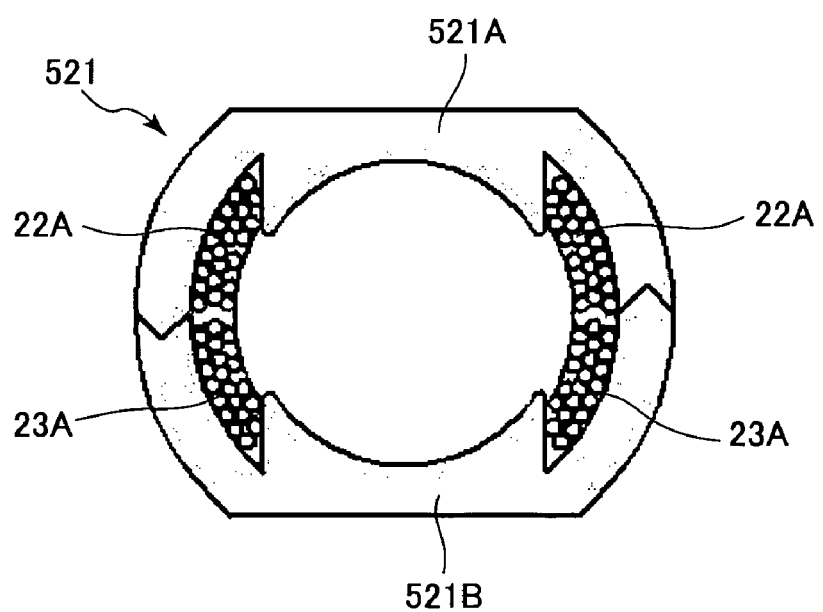
FIG. 16 is a cross-sectional view showing a motor according to a thirteenth embodiment taken along a direction orthogonal to the longitudinal direction of the motor.

FIG. 16 shows a motor according to a thirteenth embodiment of the present invention. A stator core 521 of FIG. 16 includes a first stator core 521A and a second stator core 521B. In this variation, air paths are not provided between the first and second stator cores 521A and 521B and the first and second coils 22A and 23A.

Figure 17:
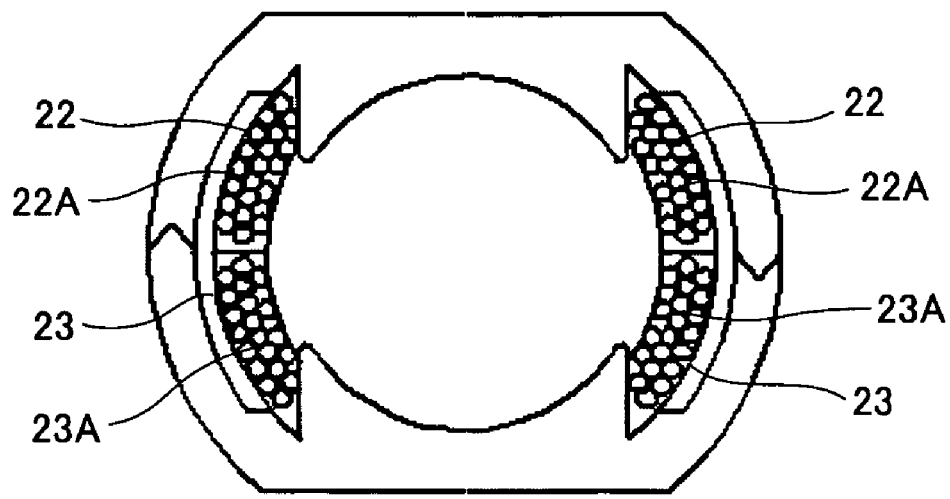
FIG. 17 is a cross-sectional view showing a motor according to a fourteenth embodiment taken along a direction orthogonal to the longitudinal direction of the motor.

FIG. 17 shows a motor according to a fourteenth embodiment of the present invention. In the first embodiment, the first and second axial portions of the first and second coils 22A and 23A are formed continuously with each other to configure the first and second molded coils 22 and 23 as an integral unit. On the contrary in the fourteenth embodiment, the first and second molded coils 22 and 23 are configured separate from each other. With this construction, only one of the first and second coils 22A and 23A is covered with the thermosetting resin 25 at one time, thereby simplifying the shape of the metal molds.

Figure 18:
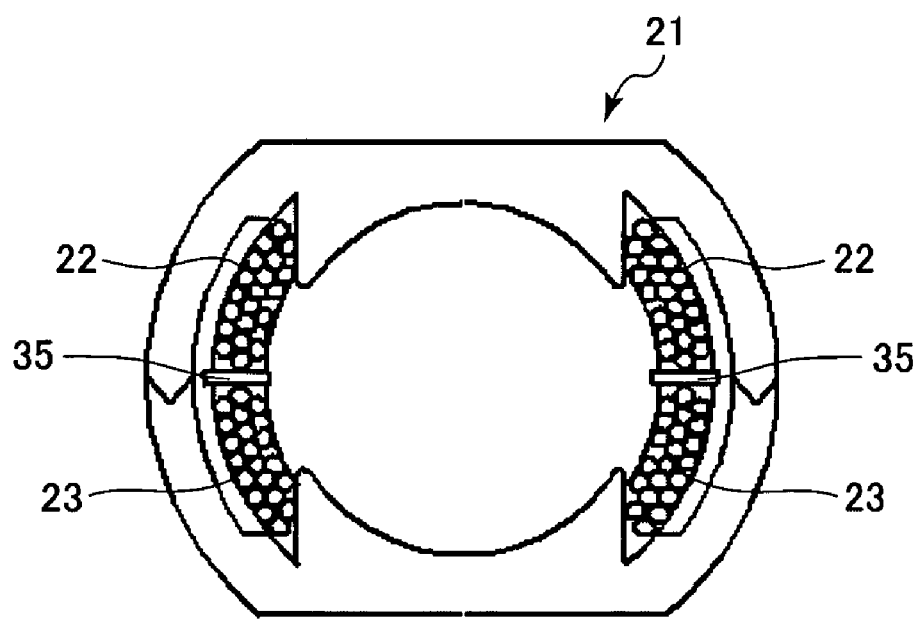
FIG. 18 is a cross-sectional view showing a motor according to a fifteenth embodiment taken along a direction orthogonal to the longitudinal direction of the motor.

FIG. 18 shows a motor according to a fifteenth embodiment of the present invention. When the first molded coil 22 and second molded coil 23 are configured separate from each other as in the fourteenth embodiment, second spacers 35 are interposed between the first molded coils 22 and second molded coils 23 as shown in FIG. 18 according to a fifteenth embodiment. This configuration prevents slight gaps from forming between the stator core 21 and the first and second molded coils 22 and 23, thereby eliminating looseness or rattling between the stator core 21 and the first and second molded coils 22 and 23. As a result, the fifteenth embodiment can prevent damage to the first and second molded coils 22 and 23 caused by vibrations or impacts.

While the invention has been described in detail with reference to specific embodiments thereof, it would be apparent to those skilled in the art that various modifications may be made therein without departing from the spirit of the invention, the scope of which is defined by the attached claims. Further, the present invention may be applied to various tools other than the circular saw described above.

What is claimed is:

1. An electric tool comprising:
   a housing formed with an air inlet for taking in air, and an air outlet for exhausting air;
   an electric motor comprising:
   a stator core including a first portion and a second portion accommodated in and fixed to the housing, the first portion and the second portion are provided independently of each other, and the second portion is fixed to the first portion, the stator core comprising a first coil mounting portion provided on the first portion and extending in an axial direction of the motor, and a second coil mounting portion provided on the second portion and extending in an axial direction of the motor, the second coil mounting portion opposing the first coil mounting portion and providing a hollow area in cooperation with the first coil mounting portion;
   a first coil mounted in the first coil mounting portion and a second coil mounted in the second coil mounting portion;
   at least a first portion of the first coil and a first portion of the second coil being covered with a resin to form a first molded coil portion which is extending in the axial direction of the motor along the first portion and the second portion of the stator core, wherein a first space is formed between the first molded coil portion and the first and the second portions of the stator core;

at least a second portion of the first coil and a second portion of the second coil being covered with a resin to form a second molded coil portion which is extending in the axial direction of the motor along the first portion and the second portion of the stator core, wherein a second space is formed between the second molded coil portion and the first and the second portions of the stator core; and a rotor rotatably disposed in the hollow area and between the first molded coil portion and the second molded coil portion; and a fan disposed in the housing for cooling the first coil and second coil by drawing air into the housing through the air inlet and blowing the air out of the housing through the air outlet.

2. The electric tool as claimed in claim 1, wherein the resin is a thermosetting resin.

3. The electric tool as claimed in claim 1, wherein the first coil and the second coil are covered with a resin to be configured integrally as a single unit.

4. The electric tool as claimed in claim 1, wherein the first coil and the second coil are covered with a resin separately.

5. The electric tool as claimed in claim 1, wherein the rotor defines said axial direction of the motor and a circumferential direction, and the stator core has axial ends and defines an inner circumferential surface; and wherein the first coil and the second coil each includes said first and second axial portions extending in the axial direction, and a pair of circumferential portions protruding outward from the axial ends of the stator core while running along the circumferential direction of the rotor, air paths being formed through said free spaces between the axial portions and the inner circumferential surface of the stator core.

6. The electric tool as claimed in claim 5, further comprising at least one protrusion connecting the axial portions and the inner circumferential surface of the stator core for dividing the air paths, the at least one protrusion being integral with one of the stator core and the axial portions.

7. The electric tool as claimed in claim 5, wherein the axial portions have opposing surfaces that oppose the rotor, and each opposing surface is out of contact from the stator core.

8. The electric tool as claimed in claim 5, wherein the axial portions have first opposing surface and second opposing surface that oppose the rotor, each opposing surface having a circumferential end portion, and wherein the first coil mounting portion has a first coil holding portion that holds the circumferential end portion of the first opposing surface, and the second coil mounting portion has a second coil holding portion that holds the circumferential end portion of the second opposing surface.

9. An electric tool comprising:

a housing formed with an air inlet for taking in air, and an air outlet for exhausting air;

an electric motor installed in the housing which comprises:

a stator core including a first portion and a second portion the first portion and the second portion are provided independently of each other, and the second portion is fixed to the first portion;

a first pair of protrusions provided on an inner surface of the first portion of the stator core and extending in an axial direction of the motor;

a second pair of protrusions provided on an inner surface of the second portion of the stator core and extending in the axial direction of the motor;

a first coil wound around the first pair of protrusions;

a second coil wound around the second pair of protrusions;

the first coil and the second coil being covered with a resin to form a unitary unit, the unitary unit including a first molded coil portion extending in the axial direction of the motor along the first portion and the second portion of the stator core, wherein a first space is formed between the first molded coil portion and the first and the second portions of the stator core, and a second molded coil portion extending in the axial direction of the motor along the first portion and the second portion of the stator core, wherein a second space is formed between the second molded coil portion and the first and the second portions of the stator core;

a rotor rotatably disposed in a hollow area provided between the respective pairs of protrusions on the first portion and the second portion of the stator core and between the first molded coil portion and the second molded coil portion; and a fan disposed in the housing for cooling the first coil and the second coil by drawing air into the housing through the air inlet and blowing the air out of the housing through the air outlet.

10. The electric tool as claimed in claim 1, wherein the rotor defines said axial direction and a circumferential direction, and the stator core has axial ends; and wherein the first coil and the second coil each comprises:

an inner molded coil including a pair of first axial portions extending in the axial direction, and a pair of first circumferential portions protruding outward from the axial ends of the stator core while running along the circumferential direction of the rotor; and an outer molded coil beside the inner molded coil, and including a pair of second axial portions extending in the axial direction, and a pair of second circumferential portions protruding outward from the axial ends of the stator core while running along the circumferential direction of the rotor, air paths each extending in the axial direction of the rotor being defined between the pair of first axial portions and the pair of second axial portions.

11. The electric tool as claimed in claim 9, wherein the resin is a thermosetting resin.

12. The electric tool as claimed in claim 9, wherein the first coil and the second coil are entirely covered with the resin which stabilizes the shape of the coil.

* * * * *